United States Patent [19]

Vulmiere et al.

[11] 4,229,097
[45] Oct. 21, 1980

[54] APPARATUS FOR THE PHOTOGRAPHIC REPRODUCTION OF TRANSPARENT DOCUMENTS

[75] Inventors: Huguette N. Vulmiere; Jacques C. Vulmiere, both of Paris, France

[73] Assignee: Agence Nationale de Valorisation de la Recherche (ANVAR), Neuilly sur Seine, France

[21] Appl. No.: 911,073

[22] Filed: May 31, 1978

[30] Foreign Application Priority Data

Jun. 3, 1977 [FR] France .............................. 77 16947

[51] Int. Cl.³ ...................... G03B 27/72; G03B 27/73
[52] U.S. Cl. ........................................ 355/35; 355/71
[58] Field of Search ..................... 355/32, 67, 71, 35

[56] References Cited

U.S. PATENT DOCUMENTS 4,110,036  8/1978  Guillaume ........................ 355/67 X Primary Examiner—Richard A. Wintercorn

[57] ABSTRACT

The apparatus comprises a principal light source, condenser, lenses, object and image planes movable with respect to one another and an auxiliary light exposure source. The condenser is constituted by two thin stepped lenses between which is arranged a corrector screen for the variations in illumination in the image plane due to the inclination of the useful beam to the axis of the system. This screen operates perpendicularly to its surface, the constituent elements of the source, of the condenser and of the pupil of the lenses used being fixed with respect to one another and movable in a single unit relative to the document to be reproduced according to the focal length of said lens determining the size of the document. The apparatus is useful for the reproduction of transparent documents in black and white or in color.

14 Claims, 21 Drawing Figures

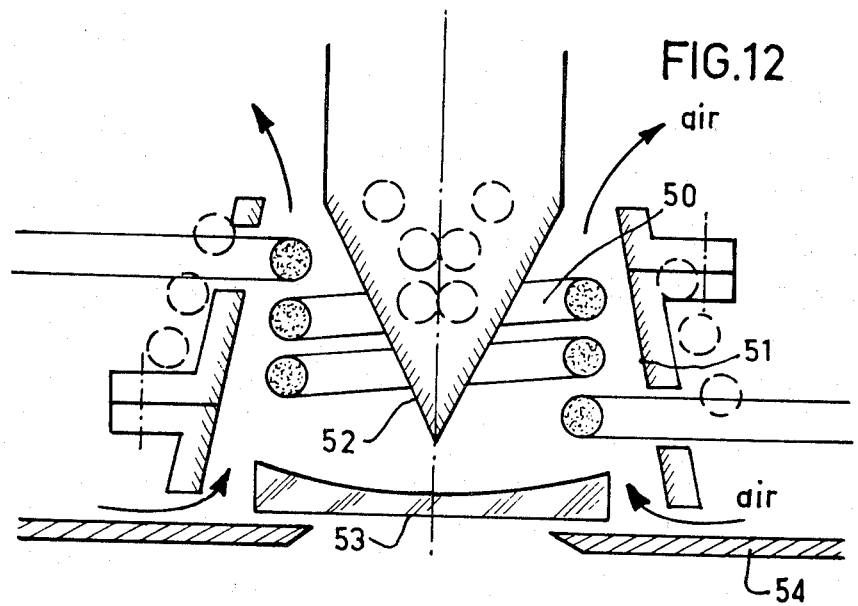
FIG.12
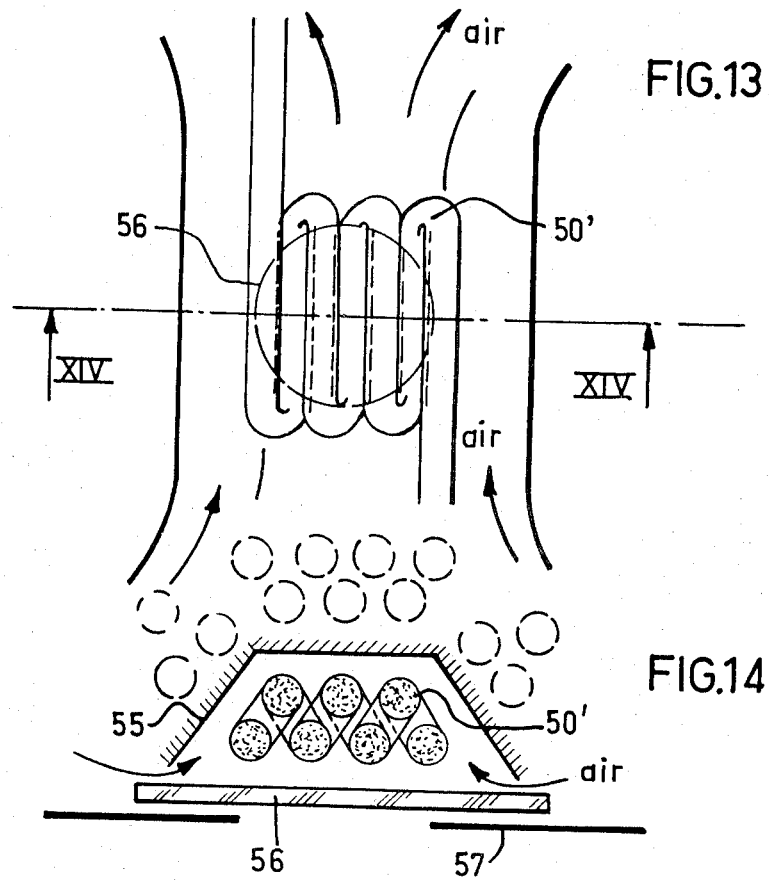
FIG.13
FIG.14

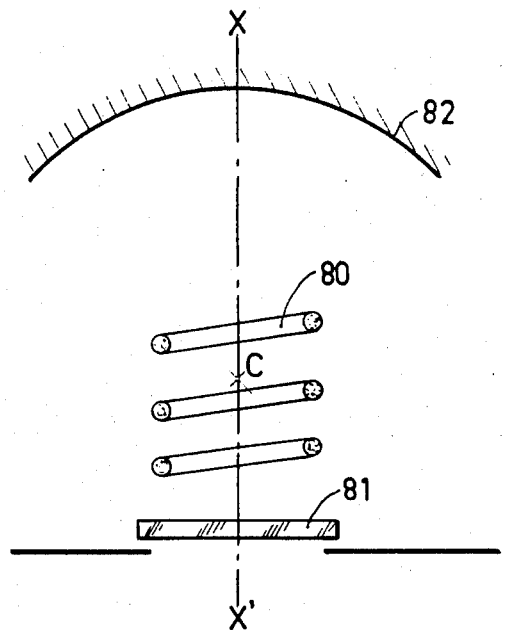
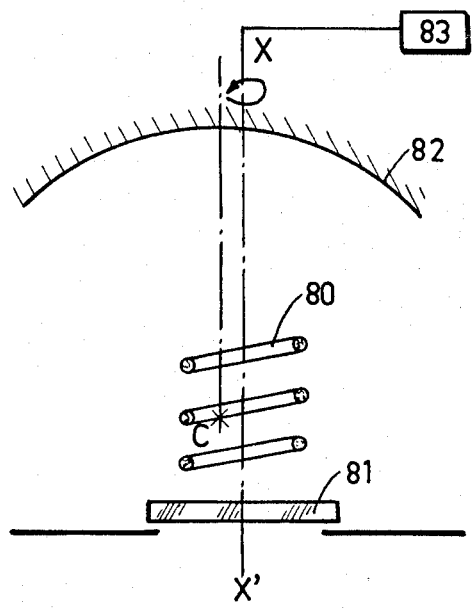
FIG.15  FIG.16
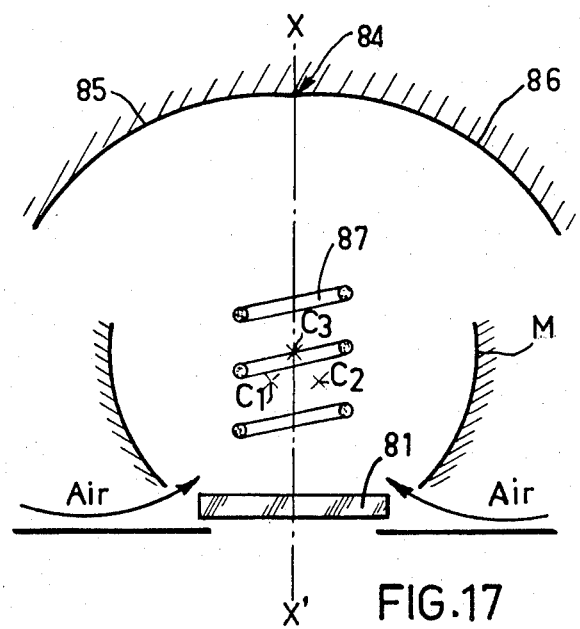
FIG.17

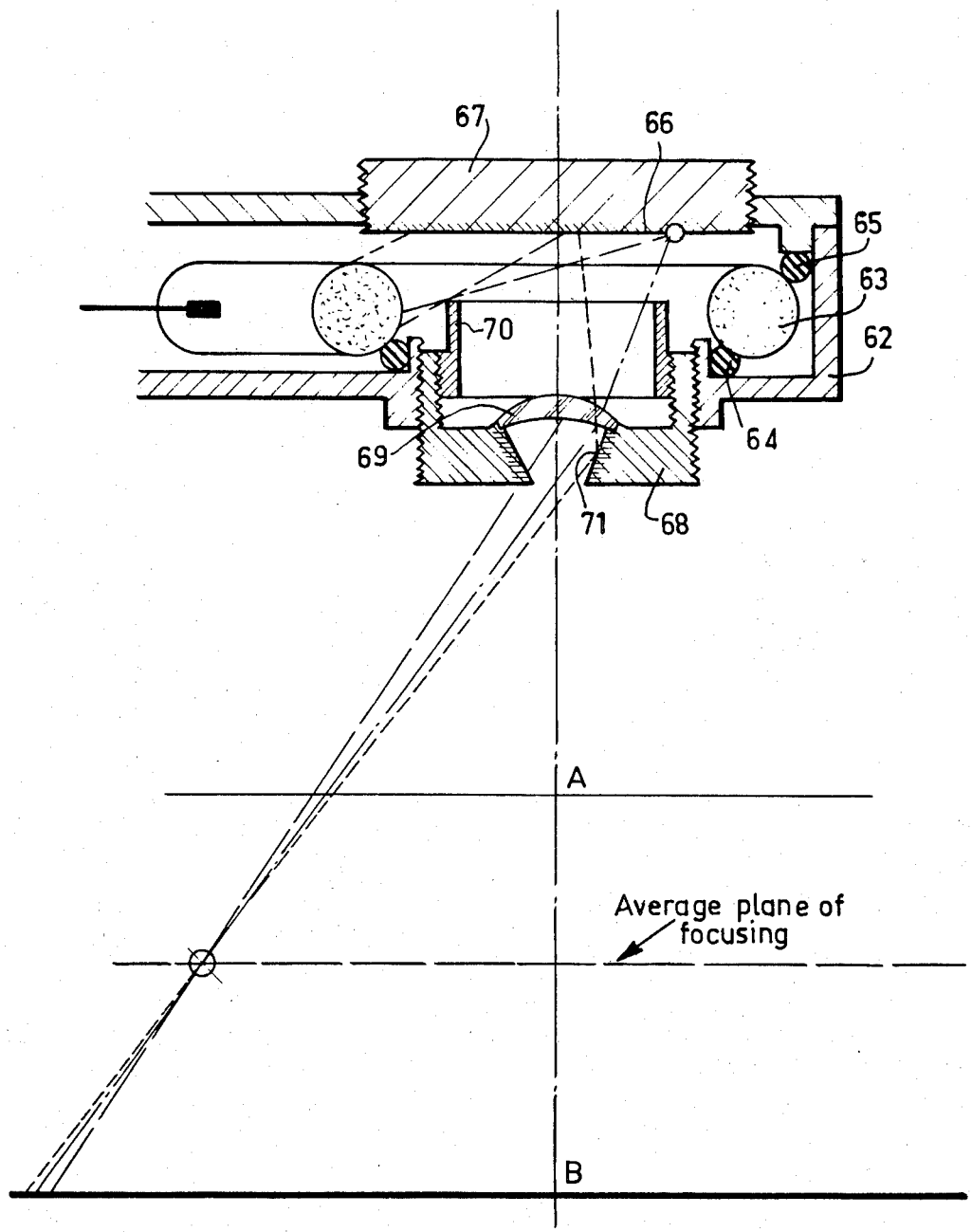

APPARATUS FOR THE PHOTOGRAPHIC REPRODUCTION OF TRANSPARENT DOCUMENTS

BACKGROUND OF THE INVENTION

1. Field of the Invention

The present invention relates to apparatus for the photographic reproduction of transparent documents in black and white or in color, such as enlargers for amateur or professional photography and more particularly apparatus providing half-tone or continuous-tone negatives for four-color printing.

2. Description of the Prior Art

The optical principle of these apparatuses is that of a photographic enlarger. The optical elements comprise a light source, a parabolic mirror condenser and interchangeable lenses of various focal lengths.

According to the type of apparatus, the object plane is fixed and the image plane is movable or the object plane is movable and the image plane is fixed. Each of these two types have advantages and drawbacks. In the case of the fixed object plane, the image plane is moved, the object plane being at man's height. The documents and the masks are in a fixed working plane at the height of a man, which facilitates manipulation. On the other hand, according the maximum separation which is thus imposed between the two object and image planes, field angles of 60° may be reached.

In the case of a movable object plane and of the fixed image plane, the field angle is generally less than 60°. On the other hand, the documents are sometimes scarcely accessible, which renders manipulation of the masks difficult.

Apparatus providing negatives for printing also comprise an auxiliary exposure source designed to flatten the contrasts at the level of the film to be printed. This auxiliary system may be constituted by a device scanning the image plane before taking of photograph by means of a tubular source or by an annular source or a ring of optical fibers placed around the objective.

It is an object of the invention to provide an apparatus enabling increase of the maximum useful sizes to reach, for example, the size of 20×25 cm for the original and 50×65 cm for the reproduction, and offering the possibility of photometering any point of the image plane when the principal and auxiliary sources are simultaneously illuminated.

In the course of the description which follows, the photometric problems relating to apparatus of the enlarger type will be recalled.

It is also an object of the invention to provide an apparatus which has uniform lighting in the plane of reproduction.

It is possible to summarize the conditions indispensible to this end in the following manner:

As regards the source, the latter must be assimilated to a plane source and placed perpendicularly to the optical axis of the system and have preferably a uniform luminance whilst radiating according to the Lambert law.

As regards the condenser, the latter must be of large dimensions to cover the maximum sizes imposed, to correct the aberrations well, in particular spherical and chromatic aberrations, in order to obtain strictly in the plane of the pupil of the objectives an excellent image of the source.

As regards the adjusting system for the sizes of the image of the source in the plane of the pupil of the objectives, it is necessary for the latter to permit selection at will according to the characteristics or the defects of the original, an illumination of the so-called semi-directed or directed, diffused light type, the image of the source in the plane of the pupil having to be respectively greater than, equal to or less than the diameter of the objective used.

It is necessary to provide a corrector screen for the influence of the inclination $\alpha$ of the useful beam to the axis of the system which is single if possible, whatever the objectives and enlargements required and which operates at normal incidence for all the field points in order to facilitate calculation and measurement of the absorption at different points of the corrector screen of the $\cos^4 \alpha$ factor.

As regards the auxiliary illumination source, the latter must produce a uniform illumination taking into account the $\cos^4 \alpha$ factor, whatever the position of the reproduction plane and enable photometering of the plane when it radiates simultaneously with the principal source.

GENERAL DESCRIPTION OF THE INVENTION

In order to respond to these various requirements, according to the invention there is provided an apparatus for photographic reproduction of transparent documents in black and white or in color of the type comprising a principal light source, colored or not, a condenser, interchangeable objectives, object and image planes movable with respect to one another, and an auxiliary light exposure source, characterized in that the condenser is constituted by two thin stepped lenses operating for their focus infinity, between which is arranged a corrector screen for the variations in illumination in the image plane due to the inclination of the useful beam to the axis of the system, this screen operating perpendicularly to its surface, the constituent elements of the source, of the condenser and of the pupil of the objective used being fixed with respect to one another and movable in a single unit relative to the document to be reproduced according to the focal length of said objective determining the size of the document.

According to another feature of the invention, the principal source is a plane source focused in the plane of the pupil of the objective and is constituted by a source of light, a disc with plane-parallel or plane-concave surfaces, for example of glass or of silica, wherein one or both faces can be frosted and against which can be placed different diaphragms, then colored filters and corrector glasses for chromatic aberrations of the stepped lenses.

According to another feature of the invention, the apparatus includes an auxiliary exposure source constituted by an annular fluorescent source with adjustable luminance without changing its color temperature, housed in a box, in the bottom of which is arranged an element uniformly lighted by said annular fluorescent source, an objective formed by a meniscus forming the image of the lighted element in the average reproduction plane, a tubular screen coaxial with the meniscus interposed between the annular source and said element and an internally reflecting truncated cone for eliminating the cat's-eye effect at the level of the output pupil of the objective.

According to another embodiment, the auxiliary exposure source is constituted by an annular fluorescent source with adjustable luminance without change in its color temperature, housed in a box in the bottom of which is arranged an element uniformly lighted by said annular fluorescent source, an objective formed by a meniscus producing the image of a corrector screen placed against and before a field lens whose focus is coincident with the image of the front pupil of the meniscus, this front pupil being constituted by the small base of an internally reflecting truncated cone.

The uniformly lighted element is either a plane or spherical, diffusing white screen, the position of which being adjustable with respect to the annular fluorescent source or an opaline transparent screen behind which is disposed a white opaque screen with radial degraded comprising in its centre an opening to place a photoelectric cell for controlling of the intensity of the annular fluorescent source.

The auxiliary source comprises further, in the plane of the front pupil, a diaphragm of variable aperture followed by colored screens.

Other features and advantages will emerge from the description which follows of particular embodiments of an apparatus according to the invention, which description is given purely by way of example and with reference to the accompanying drawings.

BRIEF DESCRIPTION OF THE DRAWINGS

In the drawings:

FIG. 12 shows in section one embodiment of a principal source of the apparatus according to the invention.

FIG. 13 shows a modification of the principal source.

FIG. 14 shows a section along the line XIV-XIV of the device of the FIG. 13.

FIG. 15 shows in section another embodiment of the principal source.

FIG. 16 shows in section the principal source of FIG. 15 modified.

FIG. 17 shows in section a preferred embodiment of the principal source.

FIG. 19 shows in section an embodiment of the auxiliary source.

DESCRIPTION OF PREFERRED EMBODIMENTS

The photometric problems which occur in the case of photographic enlargers to which the apparatus according to the invention provides a solution, will now be recalled.

In the first place, at the level of the lighting device, an image of a source is formed in the pupil of a projection objective by means of a condenser.

In conventional devices, the distance between the original and the condenser is small and constant.

The condenser is generally composed of two plane-convex lenses with spherical or aspherical surfaces. In some projection systems, such as retroprojectors, these lenses are replaced by thin stepped lenses, molded ("FRESNEL" type). The performance of these apparatuses is however insufficient for the production of photographic negatives.

In all these cases, on variation in enlargement, the adjustement of the image of the source in the pupil of the objective is effected by movement of the source along the axis of the system with or without change in condenser, the latter being constantly placed against the original.

Figure 1:
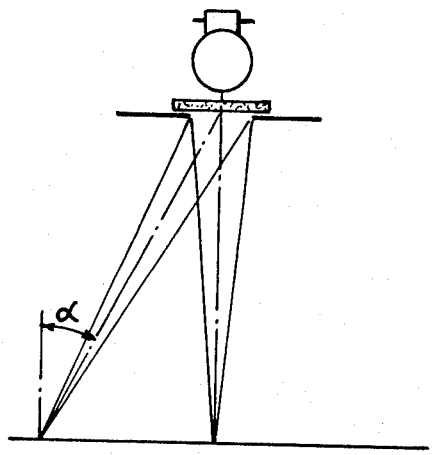
FIGS. 1 and 2 illustrate problems in the variations of illumination in the image plane due to the inclination a of the useful beam to the axis of the system.

With conventional lighting devices, variations in illumination are observed in the image plane due to the inclination $\alpha$ of the useful beam to the axis of the system (FIG. 1).

In the case of a diffusing circular plane source (comparable to the pupil of a uniformly lighted projection objective), it would be possible to compensate for the decreasing illumination due to the inclination $\alpha$ by means of a corrector screen 1 arranged at a certain distance below the pupil 2 of the projection objective, so as to have uniform lighting in the image plane 3 or 3'.

This corrector screen 1 must be calculated for a given distance of the pupil 2 from a given objective. It modifies the aberrations thereof (spherical aberrations, chromatism, astigmatism, distortion) and introduces interfering light. Moreover, it must be constructed with great accuracy. In fact, it is obtained by vacuum deposition, in order not to diffuse, and must be deposited on a plane-parallel sheet of "optical" quality and protected by an identical sheet, owing to the fragility of deposits of very low absorption.

Due to the fact of the variable thickness of the absorbing deposit from the center to the periphery of the screen and due to the fact of the variable oblique incidences of the light rays, the calculation, the construction of this screen and its rating (or grading) in transmission are difficult, so that it becomes an expensive and hardly to be envisaged solution.

It is also observed in these apparatuses that there are variations in illumination in the image plane, connected with those of the pupil of the projection objective and due to the poor quality of the image of a luminous source, non-planar in addition.

Figure 3:
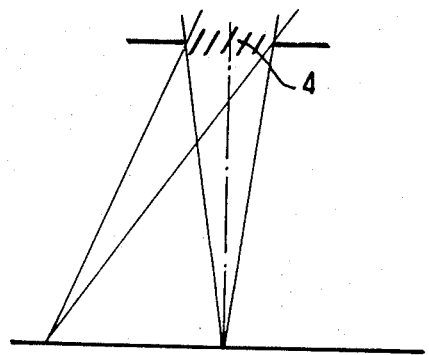
FIGS. 3 to 6 illustrate the problems in variations of illumination in the image plane connected with those of the pupil of the projection lenses.
Figure 4:
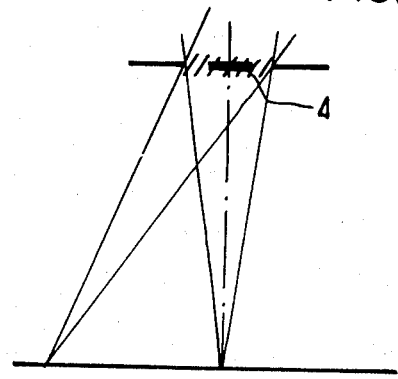

FIGS. 3 and 4 illustrate variations in lighting (not taking into account the lessening of the $\cos^4 \alpha$) in the case of a plane source of uniform and non-uniform luminance respectively, the source being focused in the plane of the pupil 4. The rounds and ovals in FIGS. 3 to 6 show diagrammatically the appearance of the pupil seen from the center or from the edge of the field.

In the case of FIG. 3, uniform illumination is obtained. It is the same in the case of FIG. 4. In fact, if the pupils are covered non-uniformly, there is observed however the same law of luminance distribution in the plane of the pupil.

Figure 5:
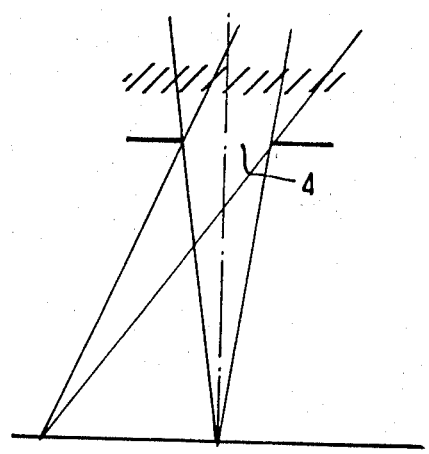
Figure 6:
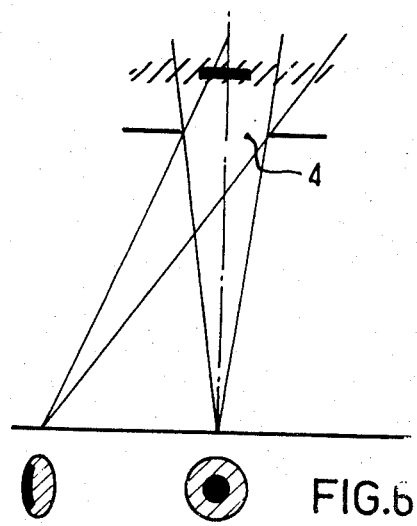

FIGS. 5 and 6 illustrate the case of a source focused outside of the plane of the pupil with respectively a uniform luminance source and a non-uniform luminance source.

In the case of FIG. 5, uniform lighting is present if the image of the source is of a diameter much greater than that of the pupil 4. This has the drawback that it is not possible to select between diffused lighting and lighting directed from the original. In this case, the lighting of the original is of the diffused type at the center of the field and of the directed type at the edge of the field.

In the case of FIG. 6, it relates to a non-uniform luminance source and the lighting is also non-uniform.

In the case of a non-planar source, spiral for example, the image of the source is not uniform. It is not formed in a single plane, that of the pupil for example. We have then a similar case to that illustrated by FIG. 6 (non-uniform lighting).

In summary, the conditions indispensable for obtaining a uniform lighting in the plane of reproduction are the following:

1. Source

It must be comparable with a plane source having the greatest possible surface, so as to permit a diffused lighting of the original document, it is placed perpendicularly to the optical axis of the system and must have preferably a uniform and high luminance, whilst radiating in each point according to the Lambert law in a solid angle $\alpha$ equal to that of the condenser.

2. Condenser

It must be of large size to cover the maximum sizes imposed and must be well corrected by aberrations, in particular spherical and chromatic, in order to obtain an excellent image of the source strictly in the pupil.

3. Adjusting system

An adjusting system for the dimensions of the image of the source in the pupil must be provided, in order to select at will a diffuse illumination, a semi-directed or a directed illumination, according to the characteristics or defects of the original.

4. Corrector screen for the factor $\cos^4 \alpha$

This screen must be single, if possible, whatever the objectives and enlargements required and must operate at normal incidence for all points in the field.

5. Auxiliary source of lighting

It must be provided in order to produce uniform and adjustable lighting, taking into account the factor $\cos^4 \alpha$ whatever the position of the reproduction plane. It must permit photometering of this plane when it illuminates simultaneously with the principal source, the two sources being able to be provided optionally with colored screens.

Figure 7:
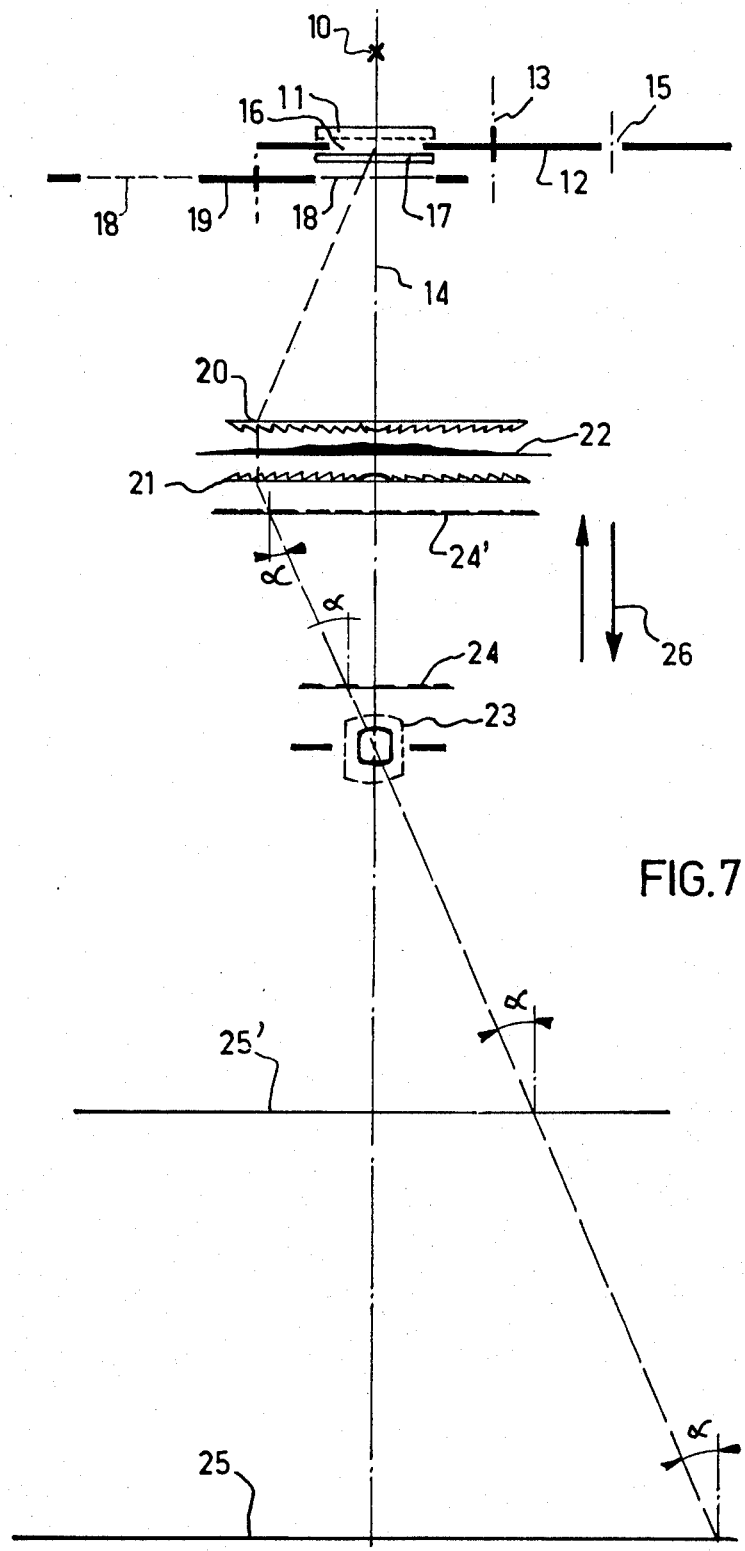
FIG. 7 shows the optical diagram of one embodiment of an apparatus according to the invention.

FIG. 7 shows the optical diagram of an apparatus according to the invention, capable of satisfying the requirements set out above.

This apparatus is constituted by a source of light 10, a glass 11 frosted on its outer flat surface to obtain a more uniform source of luminance than the source itself, and a diaphragm 12 in contact with the frosted surface. This diaphragm 12 is constituted by a disc rotatable around an axis 13 parallel to the optical axis 14 of the system. In FIG. 7, are shown two holes 15 and 16 in the diaphragm 12. The hole 16 is in the axis 14 of the system and has a diameter substantially greater than that of the hole 15.

The diaphragm 12 is interposed between the frosted glass 11 and a glass 17 designed to stop infrared.

Behind the glass 17 are arranged the colored screens 18 mounted on a rotary disc 19.

The condenser of the apparatus is constituted by two thin stepped lenses 20 and 21 and between which is arranged a $\cos^4 \alpha$ corrector screen 22, which is fixed so that its surface is perpendicular to the parallel beam. These lenses are preferably utilized at enlargement 1 and are then identical in order to limit the risks of crepe marking.

The condenser forms the image of the source in the plane of objective pupils 23 of various focal lengths.

There are shown at 24 and 24' two different positions of the document to be reproduced and at 25 and 25' the two corresponding positions of the reproduction plane.

The hole 15 of the diaphragm 12 has a diameter less than the pupils of the objectives 23 and corresponds to a directed lighting, whilst the hole 16, which is of larger diameter, corresponds to diffused lighting.

The arrows 26 indicate the directions of movement of the document 24 according to the size.

Indeed, according to the invention, it is the document 24 which is moved with respect to the assembly formed by the light source, the condenser and the objectives.

The $\cos^4 \alpha$ corrector screen 22 may be constituted in different ways. It may be formed by a deposit of absorbent thin layers, by the deposit of a layer of more or less intensely absorbent gelatine according as it is close or further from the center of the screen, or by a non-ruled or well-ruled with a random ruling, photographic film, exposed and then developed. The optical quality of this screen is of little importance given that it is placed before the objective and the original.

Figure 2:
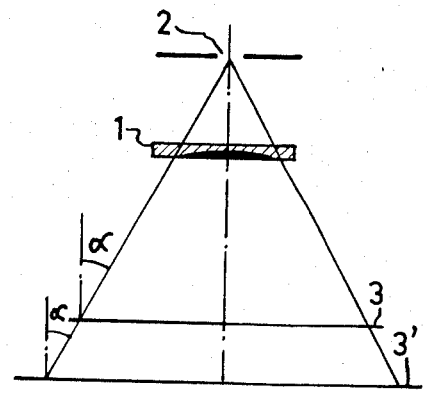

In the case of the production of this screen 22 by means of absorbent layers, due to the fact that this screen is disposed between the two lenses 20 and 21 in the parallel beam, the deposit of the layers and the grading of the screen in transmission are distinctly easier to calculate and to measure than in the case of the screen of FIG. 2. The deposit may be effected on a plate without "optical" quality.

Figures 8, 9:
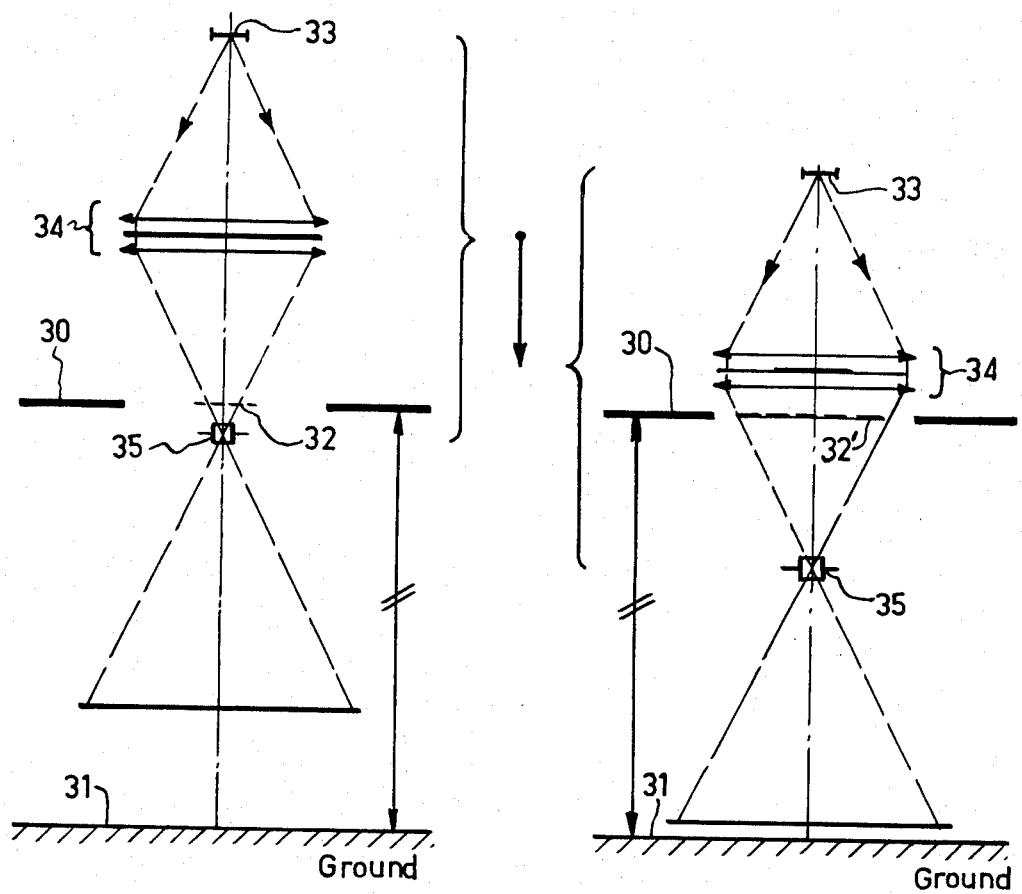
FIGS. 8 and 9 illustrate the possibilities of correcting the focusing of the apparatus according to the invention.

FIGS. 8 and 9 illustrate the possibilities of correcting the focusing of the apparatus according to the invention as a function of the different sizes.

In these figures, there is shown at 30 the working plane of the document holder and at 31 the floor on which the apparatus rests. According to the size of the document (32 or 32'), the assembly formed by the source shown diagrammatically at 33, the condenser 34 and the objective 35, are moved as a single unit.

The source-pupil of the objective conjugation is effected on manufacture and the movement of the source-condenser objective unit in the case of the fixed document holder can be done manually or automatically.

Figure 10:
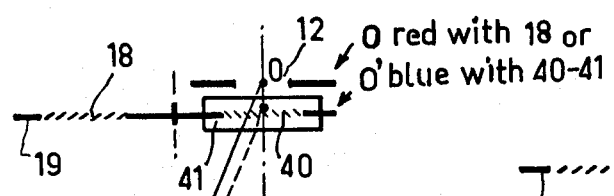
FIGS. 10 and 11 show diagrammatically two correction systems for the chromatism of the thin objectives used in the apparatus of the invention.
Figure 11:
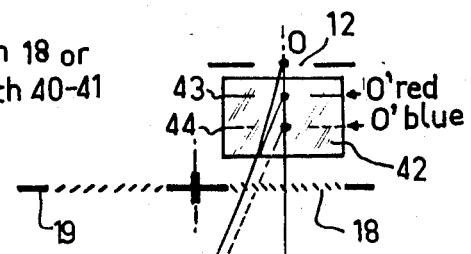

FIGS. 10 and 11 show diagrammatically two correction systems for the chromatism of the thin lenses 20 and 21. These corrections are indispensable in the case of lighting with directed light, but are not so necessarily in the case of lighting with diffused light. In the case of FIG. 10, this correction system for the chromatism is constituted by a colored screen 40 mounted between two thick plane-parallel glasses 41 arranged behind the diaphragm 12, the over-correction of the glasses 41 compensating for the chromatic under-correction of the lenses 20 and 21.

In the use, for example, of red light, the focusing is done directly on the diaphragm 12 (red O with screen 18). In the case of blue light, the focusing is carried out on the image O' of the diaphragm through the corrector assembly 40-41.

In the case of FIG. 11, the correction system is constituted by a plane-parallel glass 42 of suitable dispersion and thickness, a colored screen 18 being placeable before the corrector glass 42. The latter is intended for correcting the under-correction of the lenses 20 and 21.

In FIG. 11 the planes 43 and 44 are red and blue images of the diaphragm 12 through the corrector glass 42 and correspond to the focal point of the lenses 20 and 21.

FIG. 12 shows in section an embodiment of a principal source according to the invention.

This source is a spiral standard pulsed XENON source 50. The source 50 is surrounded by an internally reflecting truncated cone 51, whilst in the axis of the turns of the source is arranged an externally reflecting cone 52.

The device is completed by a frosted divergent lens 53 and a diaphragm 54.

The divergent lens 53 is for the purpose of reducing the apparent thickness of the spiral source 50 and to bring the image close together to the frosted surface in order to simulate a flat source as much as possible whereas the truncated cone 51 and the cone 52 are for the purpose of increasing the luminance and the uniformity of the frosted surface of the lens 53.

FIGS. 13 and 14 illustrate a modification of the principal source.

In this embodiment, a spiral pulsed XENON source 50' in another arrangement is used. Indeed, the spiral is flattened, the turns being elongated parallel to each other and arranged in quincunx in cross-section (FIG. 14). The system is completed by a mirror 55 with trough-shaped section, by a frosted glass 56 and a diaphragm 57. This modification enables greater uniformity, and greater luminosity of the frosted glass to be obtained as well as easier air cooling.

FIG. 15 shows another embodiment of the principal source.

In this case, a spiral pulsed standard XENON source 80 is used; this source is placed behind the frosted glass 81 in order to have the XENON source image on this glass. To improve the lighting of the source 80, one disposes behind the source a concave spherical internally reflecting mirror 82 so as to obtain a revolution system, that is to say that the axis XX' formed by the spiral constituting the XENON source is confounded with the axis of the optical system and the curvature radius of the spherical mirror is such that the center C of said mirror is on said axis substantially inside said spiral.

With a principal source of the type showed on FIG. 15, there can still exist in the center of the frosted glass 81 a dark zone. This zone can be attenuated in using a device represented on FIG. 16. Like for the device of FIG. 15, one uses a spiral pulsed XENON source 80, a spherical mirror 82 of center C and a frosted glass 81. But in this case, the mirror 82 is slightly decentered, which shifts the image of the source laterally but suppresses the revolution symmetry. To restore this symmetry, one causes the mirror to rotate around the axis XX' of XENON source as indicated by the arrow by means of a motor 83 or similar device. A better uniformity of lighting of frosted glass 81 is thus obtained. Such a construction is more difficult to realize mecanically. Further, the obtained lighting is not of revolution at a given moment.

The device of principal source according to FIG. 17 permits avoiding such a rotation of the spherical mirror. In this case, the mobile decentered spherical mirror of FIG. 16 is replaced by a fixed concave toroidal/internally reflecting mirror 84 so as to obtain a revolution system. The centres $C_1$ and $C_2$ respectively of the torus parts 85 and 86 have been chosen slightly decentered with respect to the axis XX' of the spiral XENON source 87 and are located so that the images formed by the different areas of the mirror form again slightly greater on both sides of the plane of the frosted glass 81 and of axis XX'.

The device of principal source with torodial mirror can be further improved in disposing a second mirror M, spherical and concave, internally reflecting. The center $C_3$ of this second mirror is on the axis XX' of the XENON source. The mirror M is placed in front of the toroidal mirror 84 and surrounds the source 87.

The presence of mirror M permits a supplementary increase of the lighting of the "whole source" by recovery of the light beams placed out of the field of the toroidal mirror. This spherical mirror M presents two further advantages: one, it facilitates the circulation of air around the spiral source, thus its cooling, and second, it shuts out beams, which, without mirror, would give parasite light around the apparatus.

Figure 18:
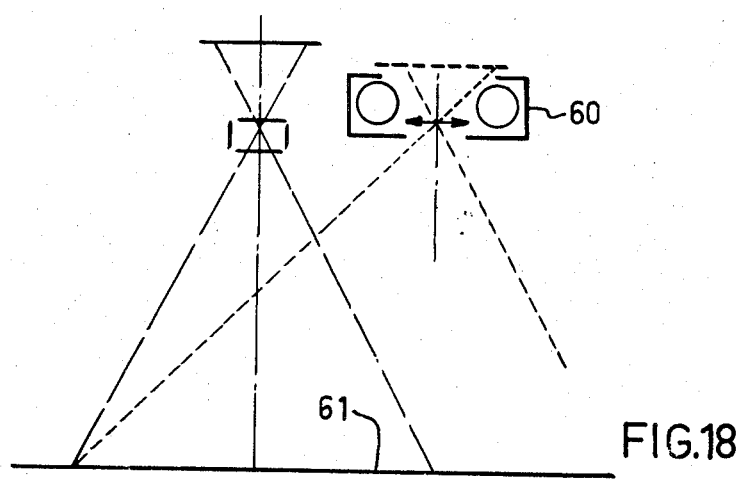
FIG. 18 shows diagrammatically the arrangement of the auxiliary source of the apparatus according to the invention.

FIG. 18 shows the location of an auxiliary source 60 in an apparatus according to the invention for uniformly illuminating the reproduction plane 61.

FIG. 19 shows in section one embodiment of this auxiliary source.

It includes a box 62 in which an annular fluorescent source 63 is enclosed kept in place by centering seals 64 and 65.

In the bottom of the box 62 is movably mounted a plane or spherical diffusing white screen 66. The screen 66 is fast to a plug 67 screwed into the box 62, which permits adjustment of the distance between the screen 66 and the annular fluorescent source 63, the screen 66 being arranged in the axis of this source. In the box, opposite the screen 66, is arranged, in a cylinder 68 screwed into the box 62, an objective constituted by a meniscus 69.

Between the source 63 and the screen 66 is interposed a tubular screen 70 adjustable along the axis of the optical system so as to modify the distribution of lighting over the diffusing plane.

On the side of the meniscus 69 opposite the screen 66, is provided, on the edges of this meniscus, a reflecting truncated cone 71 designed to eliminate the cat's-eye effect at the level of the output pupil of the meniscus 69.

In FIG. 19, is shown at A and B the end reproduction planes, and in dashed lines the average focusing plane.

Figure 20:
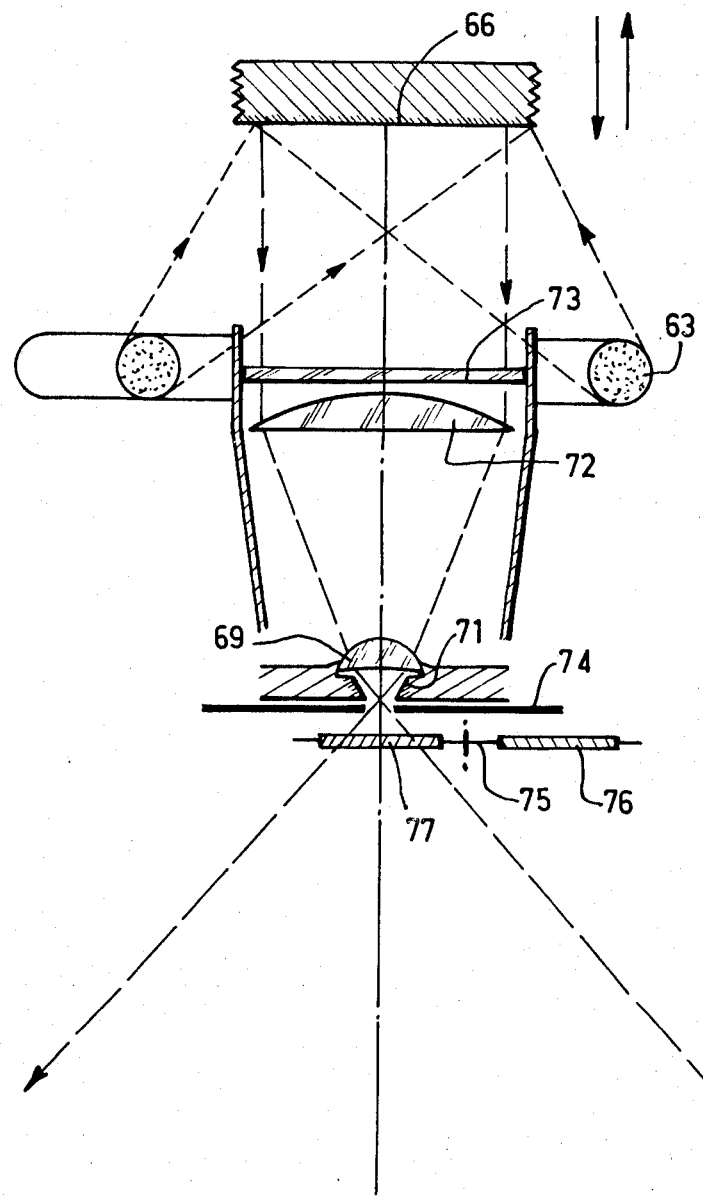
FIG. 20 shows diagrammatically a modification of the embodiment of the auxiliary source.

According to a modification of this device shown in FIG. 20, the tubular screen 70 (FIG. 19), which modifies the light distribution in the plane of the diffusing screen 66, may be replaced by a field lens 72 and a corrector screen 73 for the term $\cos^4 \alpha$ factor. The focus of the field lens 72 is conjugated with the image of the pupil in front (small base of the truncated cone 71) of the meniscus 69. The corrector screen 73 is placed in a parallel beam against the field lens 72 between the latter and the diffusing screen. The diffusing screen 66 is suitably located with respect to the annular source 63 in order that its illumination may be uniform. The pupil in front of the objective may be completed by an adjustable diaphragm 74 and by a holder disc 75 for colored glasses 76-77.

The latter devices may be provided in the embodiment of FIG. 19.

According a modification of device of FIG. 20, the diffusing white screen 66 can be replaced by a disc 90 transparent, translucent or opaline (FIG. 21) in synthetic glass, such as a methylpolymethacrylate, for example that is sold in France by the Society Altulor under the commercial name "Altuglas". Behind disc 90 is placed a white opaque screen 91 bearing the reproduction of a radial degraded to modify repartition of luminance of disc 90. This screen 91 is obtained by photography or by any other suitable process. A photoelectric cell 93 is further present in this device of auxiliary source; this cell is placed behind an opening 92 disposed at the center of this degraded screen. This cell needs to control the intensity of fluorescent source 63.

Figure 21:
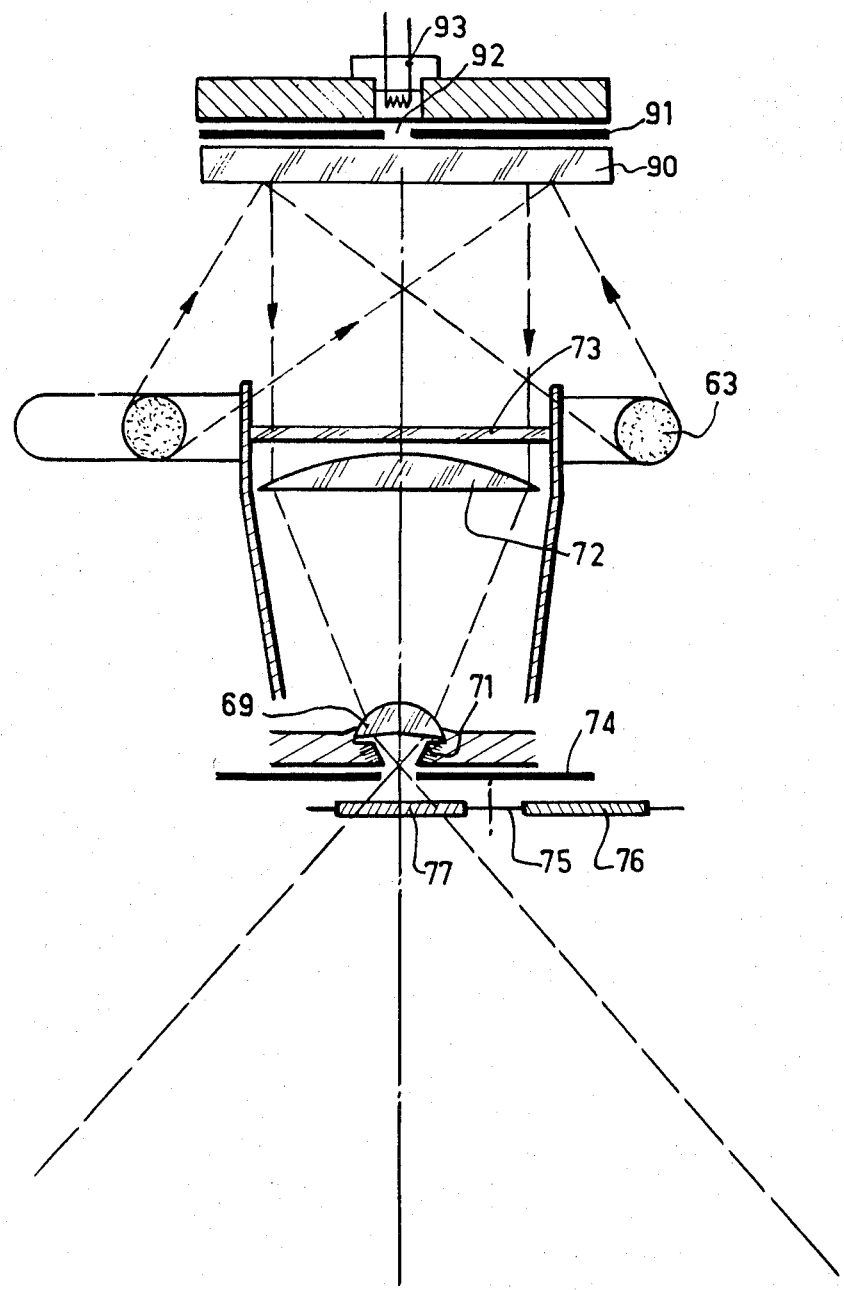
FIG. 21 shows another embodiment of the auxiliary source.

Further, all the other elements of the device of auxiliary source of FIG. 21 are identical to those of FIG. 20.

This latter device can be used in the embodiment of FIG. 19.

The apparatus according the present invention permits to obtain a certain number of advantages on a practical point. It permits especially to reduce the time of exposure up to 10 times in relation with apparatuses of the prior art. It permits further to obtain very good reproductions with sources 4 to 5 times less strong than that of prior art, for example with sources of 5 KW. It must be added as already mentioned above, that is is possible with the apparatus according the invention to increase the maximum useful sizes to reach, for example, the size of 20×25 cm for the original and 50×65 cm for the reproduction. The apparatus according the invention finds an application in the industrial field: to effect a reproduction, only the principal source is obligatory (FIG. 7) but for making photogravure, it is obligatory to place further an auxiliary source (FIGS. 18 to 21).

Of course the invention is not limited to the particular embodiments illustrated and described above but covers on the contrary all modifications.

We claim:

1. Apparatus for the photographic reproduction of transparent documents in black and white or in color, of the type comprising a principal light source, colored or uncolored, a condenser, interchangeable objectives, object and image planes movable with respect to one another and an auxiliary light exposure source, wherein said condenser is constituted by two thin stepped lenses, the source being in the object focal plane of the first of said lenses and the pupil of the objective being in the image focal plane of the second lens, a corrector screen arranged between said two lenses for the variations in illumination in the image plane due to the inclination of the useful beam to the axis of the system, this screen being fixed so that its surface is perpendicular to the parallel ray beam, the constituent elements of the source, of the condenser and of the pupil of the objective used being fixed with respect to one another and movable in a single unit relative to the document to be reproduced according to the focal length of said objective determining the size of the document.

2. Apparatus according to claim 1, wherein the principal source is a plane source focused in the plane of the pupil of the objective and is constituted by a light source, a disc with plane parallel or plane-concave surfaces wherein one or both faces can be frosted, and against which different diaphragms can be placed, then colored filters and chromatic aberration corrector glasses of the stepped lenses.

3. Apparatus according to claim 2, wherein said light source is constituted by a spiral pulsed XENON source surrounded by an internally reflecting truncated cone and within which is arranged an externally reflecting cone, the frosted glass being constituted by a divergent lens.

4. Apparatus according to claim 2, wherein said light source is constituted by a spiral pulsed XENON source with flattened turns parallel to each other and arranged in quincunx in a sectional plane transverse to the turns, the source being housed in a mirror of trough-shaped section.

5. Apparatus according to claim 2, wherein said light source is constituted by a spiral XENON source behind which is disposed a concave toroidal internally reflecting mirror, the centres of said mirror being slightly shifted with respect to the axis of the spiral constituting the XENON source.

6. Apparatus according to claim 5, wherein the spiral XENON source is surrounded by a concave spherical internally reflecting mirror, the centre of which being on the axis of the spiral constituting the XENON source.

7. Apparatus according to claim 1, comprising a correcting device for the chromatism of the thin lenses constituted by a thick glass plate in which a colored screen is mounted.

8. Apparatus according to claim 1, comprising a correcting device for the chromatism of the thin lenses constituted by a thick plate of suitable dispersion compensating for the chromatism for the whole of the spectrum.

9. Apparatus according to claim 1, wherein the two thin stepped lenses are identical and operate with a magnification equal to 1.

10. Apparatus according to claim 1, comprising an auxiliary exposure source constituted by an annular fluorescent source with adjustable luminance without change in its color temperature, housed in a box, in the bottom of which is arranged an element uniformly lighted by said annular fluorescent source, an objective formed by a meniscus producing the image of the lighted element in the average reproduction plane, a tubular screen coaxial with the meniscus interposed between the annular source and said element and an internally reflecting truncated cone to eliminate the cat's-eye effect at the level of the output pupil of the objective.

11. Apparatus according to claim 1, comprising an auxiliary exposure source constituted by an annular fluorescent source with adjustable luminance without change in its color temperature, housed in a box in the bottom of which is arranged an element uniformly lighted by said annular fluorescent source, an objective formed by a meniscus producing the image of a corrector screen placed against and before a field lens whose focus is coincident with the image of the front pupil of the meniscus, this front pupil being constituted by the small base of an internally reflecting truncated cone.

12. Apparatus according to claims 10 or 11 wherein the uniformly lighted element is a plane or spherical diffusing white screen, the position of which being adjustable with respect to the axis of the annular fluorescent source.

13. Apparatus according to claims 10 or 11, wherein the uniformly lighted element is an opaline transparent screen behind which is disposed a white opaque screen with radial degraded comprising in its centre an opening to place a photo-electric cell for the controlling of the intensity of the annular fluorescent source.

14. Apparatus according to claim 10 or 11 comprising in addition, in the plane of said front pupil, a diaphragm of variable aperture followed by colored screens.

* * * * *